US006675064B1

(12) United States Patent
Yingling et al.

(10) Patent No.: US 6,675,064 B1
(45) Date of Patent: Jan. 6, 2004

(54) PROCESS FOR THE PHYSICAL SEGREGATION OF MINERALS

(75) Inventors: Jon C. Yingling, Lexington, KY (US); Rajive Ganguli, Fairbanks, AK (US)

(73) Assignee: University of Kentucky Research Foundation, Lexington, KY (US)

( * ) Notice: Subject to any disclaimer, the term of this patent is extended or adjusted under 35 U.S.C. 154(b) by 458 days.

(21) Appl. No.: 09/669,076

(22) Filed: Sep. 25, 2000

Related U.S. Application Data

(60) Provisional application No. 60/154,464, filed on Sep. 17, 1999.

(51) Int. Cl.[7] .............................................. G06F 19/00

(52) U.S. Cl. .......................... 700/223; 700/30; 700/31; 700/36; 700/51; 700/214; 700/37; 703/4; 703/14; 711/147

(58) Field of Search .............................. 700/30, 31, 36, 700/51, 214, 223, 37; 703/4, 14; 711/147

(56) References Cited

U.S. PATENT DOCUMENTS

| | | | |
|---|---|---|---|
| 4,282,006 | A | 8/1981 | Funk |
| 4,311,488 | A | 1/1982 | Verschuur |
| 4,405,453 | A | 9/1983 | Wells |
| 4,406,664 | A | 9/1983 | Burgess et al. |
| 4,412,843 | A | 11/1983 | Burgess et al. |
| 4,416,666 | A | 11/1983 | Funk |
| 4,441,887 | A | 4/1984 | Funk |
| 4,468,232 | A | 8/1984 | Funk |
| 4,477,259 | A | 10/1984 | Funk |
| 4,479,806 | A | 10/1984 | Funk |
| 4,494,959 | A | 1/1985 | Funk |
| 4,521,218 | A | 6/1985 | Greenwald, Sr. |
| 4,624,680 | A | 11/1986 | Funk |
| 4,650,496 | A | 3/1987 | Funk |
| 4,662,894 | A | 5/1987 | Greenwald, Sr. |
| 4,835,701 | A | 5/1989 | Ohiwa et al. |
| 4,916,719 | A | 4/1990 | Kawatra et al. |
| 5,033,004 | A | 7/1991 | Vandivier, III |
| 5,043,925 | A | 8/1991 | Archer et al. |
| 5,153,838 | A | 10/1992 | Kindig |
| 5,236,089 | A | 8/1993 | Smitham et al. |
| 5,262,962 | A | 11/1993 | Kindig |
| 5,376,280 | A | 12/1994 | Wilhelm et al. |
| 5,380,342 | A | 1/1995 | Leonard, III et al. |
| 5,729,470 | A | 3/1998 | Baier et al. |
| 5,777,890 | A | 7/1998 | Halley et al. |
| 5,852,560 | A | 12/1998 | Takeyama et al. |

OTHER PUBLICATIONS

Cheng, W.H., Woodcock, B., Sargent, D. and Gleit, A., 1982, "Time Series Analysis of Coal Data from Preparation Plants," Journal of the Air Pollution Control Association, vol. 32, No. 11, Nov., pp. 1137–1141.
Ganguli, R., Yingling, J.C., Zhang, J., Sottile, J., Kumar, R., 1999, "Optimal Control of Coal Segregation Using on–line Quality Analyzers," Mining Enginerring, Apr., pp. 41–48.
Hamilton, J.D., 1994, Time Series Analysis, Princeton University Press, Princeton, New Jersey, 799 pp. (pp. 134–137).
Kamada, H., Kawaguchi, H. and Onodera, J., 1986, "On the Coal Blending Process Control by On–line Ash Monitors," 10th International Coal Preparation Congress, Edmonton, Canada, Sep., pp. 245–266.
Presentation by Ganguli, et al. to EPSCOR, Oct. 1998.
Presentation by Ganguli, et al. to EPSCOR, May 1998.

*Primary Examiner*—Anil Khatri
*Assistant Examiner*—Douglas M. Shute
(74) *Attorney, Agent, or Firm*—King & Schickli, PLLC

(57) ABSTRACT

With highly heterogeneous groups or streams of minerals, physical segregation using online quality measurements is an economically important first stage of the mineral beneficiation process. Segregation enables high quality fractions of the stream to bypass processing, such as cleaning operations, thereby reducing the associated costs and avoiding the yield losses inherent in any downstream separation process. The present invention includes various methods for reliably segregating a mineral stream into at least one fraction meeting desired quality specifications while at the same time maximizing yield of that fraction.

21 Claims, 11 Drawing Sheets

(a)

(b)

PROCESS FOR THE PHYSICAL SEGREGATION OF MINERALS

This application claims the benefit of U.S. Provisional Patent Application Ser. No. 60/154,464, filed Sep. 17, 1999, entitled "Process for Physical Segregation of Coal."

This invention was made with government support under contract number 4-33585 awarded by the Department of Energy. The government may have certain rights in this invention.

TECHNICAL FIELD

The present invention relates generally to the segregation of minerals into fractions depending on a certain characteristic and, more particularly, to a plurality of methods for improving the yield of a particular segregated fraction of a mineral stream.

BACKGROUND OF THE INVENTION

Upon extracting or recovering minerals from a source, further processing is often required prior to shipping for later use. For example, coal emanating from a mine, known as "run-of-mine" or "r.o.m." coal, is usually washed to reduce the content of ash such that it meets the specifications of a particular customer. The cost of washing the coal runs anywhere from $3.00 to $5.00 per ton. Thus, it is a considerable expense associated with the coal mining process.

To reduce this expense, mine operators may physically segregate coal into wash and no wash "fractions" or piles. As should be appreciated, the coal segregated into the no wash pile must at a minimum meet the customer specification to be ready for shipment without washing. In contrast, coal sent to the wash pile is either washed to meet customer specifications prior to shipment or, in the case of extremely poor quality coal, completely rejected.

Central to the segregation strategy is an online analyzer for detecting a particular parameter of the coal stream at a given instant. Typically, the online analyzer is mounted on or above the main conveyor belt exiting the mine and detects a parameter that correlates to the presence of a particular component, such as ash, sulfur, BTU, or the like. Coal deemed "good quality" (i.e., at least meeting the customer specification for the selected parameter) is sent to the no wash pile, while that deemed "bad quality" is sent to the wash pile. Usually, the physical segregation of the coal is accomplished using a device such as a "flop" gate, which as its name connotes is a gate that "flops" to and fro over a portion of a divided chute positioned under the conveyor belt to direct the coal to the desired pile.

While the online analyzer recognizes the quality based on the detected parameter, the decision to send a segment of coal to the wash or no wash pile has in the past been made by a segregation control procedure that works in conjunction with the analyzer. Since the quantity and quality of the no wash pile affects processing economics significantly, it is imperative that the segregation algorithm is efficient. Of course, segregating r.o.m. coal in real-time into wash and no wash fractions is a simple matter if maximizing yield is not taken into account. For example, the algorithm could simply make the decision that only r.o.m. coal that at least meets the particular customer specification is accepted, i.e., the cutoff level of the detected parameter is set at the customer target, where cutoff level is defined as the lowest acceptable quality for a particular block of coal to be sent to the no wash pile. This strategy yields a no wash pile with average quality that is much better than the target quality because only coal that meets and exceeds target quality is placed in the no wash pile. However, since in reality the target needs only to be met on average, and not for every unit of coal in the shipment, this strategy will have poor yield. In other words, the coal sent to the no wash pile will have a much better quality than required, while the coal sent to the wash pile will increase as a result. This reduces efficiency and increases costs.

Present day industrial segregation algorithms make cutoff adjustments to improve yield. These algorithms are loosely based on conventional feedback control schemes that examine the error between the ash level of the no-wash pile and the quality target value. Based on the detected error, adjustments to the cutoff value are made. These adjustments involve the use of arbitrary numerical gains that are set exogenously by trial and error and are not linked to the monitored process. Moreover, no attempts are made to account for and characterize the stochastic, or random, nature of the process (which is an issue that, as will be understood from reviewing the description that follows, is central to segregation control). As a result, the current industrial algorithms leave much to be desired in terms of both accuracy and efficiency. This is especially true when the coal comes from multiple seams, or "sections" of the mine, having different values of the particular parameter under consideration (i.e., different ash levels).

The decision to send any block of coal to the wash or no wash pile should depend on two factors: (1) the average quality level of the no wash pile at the present time; and (2) the distribution of the quality of coal expected in the future. Using these criteria ensures maximization of the yield, while at the same time the average quality of the shipment meets the target value. The determination of the average composition of the no wash pile at a given instant is straightforward, as it is only a matter of recording the values corresponding to the quality of the coal or other mineral previously to the no wash pile and averaging those values.

The future quality, however, is not simple to predict. Frequent changes in the nature of the mining process or the quality of coal render making any such prediction difficult. Field observations demonstrate that the distribution of coal quality changes substantially and unpredictably over time. Accordingly, a practical coal segregation system needs to view the observations as a realization of a non-stationary stochastic process. Instead of predicting the future, segregation decisions could be based on the present stochastic nature of the process. This stochastic nature could be defined in terms of a statistical description, such as a distribution form for the desired or acceptable quality levels. If the segregation decision were consistently the best for the present nature of the process, then in the long run, high yields should be realized. Of course, yields with such a strategy will be lower than what might have been obtained could the long run distribution of coal quality somehow be forecast a priori. However, in the absence of stationarity, such forecasting is simply not possible. Moreover, if the process were, in fact, stationary, this strategy would still optimize yields because the present and long term distributions would be identical. Thus, for successful application, the segregation strategy must accurately estimate the current statistical nature of the process.

SUMMARY OF THE INVENTION

To fulfill the needs identified above, and to overcome the shortcomings of prior art methods of mineral segregation, the present invention comprises a plurality of methods of segregating a mineral, such as coal, based on the level of a particular component, such as ash, sulfur, or the like. Specifically, the method employs mathematical and statistical modeling techniques to segregate a flowing stream of minerals into at least two fractions: one of that may undergo further processing prior to shipment (or in some cases, may simply be discarded), and one that does not require further processing (that is, the level of the component substantially meets a customer specification as to the content of that component). By maximizing the amount of the mineral sent to the fraction that does not require further processing, while still meeting the customer target, the overall processing time and the concomitant processing expense are both advantageously reduced.

In accordance with a first aspect of the invention, a method of segregating a mineral stream into a first fraction substantially meeting a particular customer specification and a second fraction requiring further processing such that the proportion of the mineral stream in the first fraction is maximized is disclosed. The method comprises: (a) observing a value of a selected parameter for a plurality of segments of the mineral stream to establish an original minimum history of data values; (b) creating an existing model to fit the minimum history; (c) obtaining a new value of the parameter for a particular segment of the mineral stream; (d) determining whether the new value is likely in view of the model; (e) calculating a cutoff value based on a current target value; (f) making a segregation decision based on whether the new value is above or below the cutoff value; and (g) repeating steps (c)–(f). The current target is an average level of the selected parameter that all future segments of mineral segregated to the first fraction must meet so that the entire first fraction meets the customer specification.

In one embodiment, if the new value observed is likely given the existing model, the method further includes establishing an empirical distribution including the new value and the original minimum history of data values, and the step of calculating a cutoff value includes determining the cutoff value as a point of truncation of the histogram of the empirical distribution such that the mean of the truncated distribution is equal to the current target value.

In a second embodiment, if the new value is likely given the existing model, a normal distribution is assumed based on the new value and a mean and variance of the original minimum history of data values is computed. Then, the step of calculating a cutoff value includes determining the cutoff value as a point of truncation of said normal distribution such that the mean of the truncated normal distribution is equal to the current target value.

If the new value is not likely given the existing model according to either embodiment, then the original minimum history of values are discarded and the new value is recorded as a first value in a new minimum history. A new cutoff value is calculated based on a new current target value using at least the original minimum history, and preferably the entire history available since the method began. A determination is made whether the new value is above or below the new cutoff value, and a segregation decision is based on the determination. A subsequent new value is then obtained, a new cutoff value is calculated, and the segregation decisions are made until the new minimum history has a predetermined number of new values. Once this is completed, the new minimum history of values are substituted for the original minimum history in step (b) above and an updated model is created to replace the existing model using the new minimum history prior to repeating steps (c)–(f).

In accordance with a preferred embodiment, the step of determining whether the value is likely includes: predicting the new value using the existing model; calculating a residual value between the predicted new value and the actual new value; using the residual value to determine whether the new value should be retained as part of the original minimum history or a new minimum history including the new value should be established and substituted for the original minimum history in step (b) prior to repeating steps (c)–(f).

In an alternate embodiment, the existing model is a time series model, and if the new value is likely given the existing model, the method further includes forecasting a mean and variance at an appropriate lead using the time series model. The cutoff value is then calculated as a point of truncation of a normal distribution having the forecasted mean and variance such that the mean of the truncated distribution is equal to the current target value.

In a second alternate embodiment where the existing model is a time series model, the minimum history of values includes a substantial number of original values, and if the new value is not likely given the existing model, the method further includes updating the existing time series model using at least the substantial number of values and forecasting a mean and variance at an appropriate lead using the updated model. The cutoff value is then calculated as a point of truncation of a normal distribution having the forecasted mean and variance such that the mean of the truncated distribution is equal to the current target value.

In either alternate embodiment wherein the model is a time series model, the minimum history of values includes a substantial number of original values, and if the new value is not likely given the existing model, the method further includes the following steps prior to the calculating step: (d)(1) updating the existing model using a predetermined minimum number of the original values; (d)(2) using the updated model for a certain number of new values obtained, while discarding a same number of the original values in the substantial number of values; (d)(3) forecasting a mean and a variance at an appropriate lead using the updated model; (d)(4) calculating a new cutoff value based on a new current target value, wherein the new cutoff value is calculated as a point of truncation of a normal distribution having the forecasted mean and variance such that the mean of the truncated distribution is equal to the new current target value; (d)(5) determining if a current new value under consideration is above or below the new cutoff value; (d)(6) making a segregation decision based on the determination; (d)(7) repeating steps (d)(1)–(d)(6) until a substantial number of new values are taken; and (d)(8) substituting the substantial number of new values for the substantial number of original values forming the minimum number of values in step (b) and substituting the updated model for the existing model prior to repeating steps (c)–(f).

In accordance with a second aspect of the invention, a method of segregating a mineral stream into a first fraction meeting a particular customer specification and a second fraction requiring further processing such that the portion of the mineral stream in the first fraction is maximized is disclosed. The method comprises: (a) observing a selected parameter of a plurality of segments of the mineral stream to establish a substantial number of original data values; (b) creating an existing model to fit the substantial number of original values; (c) obtaining a new value of the parameter for a particular segment of the mineral stream; (d) determining whether the new value is likely given the existing model; (e) calculating a cutoff value based on a current target value; (f) determining if the new value is above or below the cutoff value and making a segregation decision based on the determination; and (g) repeating steps (c)–(f).

In one embodiment, if the new value is likely given the existing model, the method further includes forecasting a mean and variance at an appropriate lead using the existing model. The cutoff value is then calculated as a point of truncation of a normal distribution having the forecasted mean and variance such that the mean of the truncated distribution is equal to the current target value.

In another embodiment, if the new value is not likely given the existing model, the method further includes updating the existing model using at least the substantial number of original values and forecasting a mean and variance at an appropriate lead using the updated model. The cutoff value is then calculated as a point of truncation of a normal distribution having the forecasted mean and variance such that the mean of the truncated distribution is equal to the current target value.

In any case, if the new value is not likely given the existing model, the method further includes the following steps prior to the calculating step: (d)(1) updating the existing model using a predetermined minimum number of the original values; (d)(2) using the updated model for a certain number of new values obtained, while discarding a same number of the original values in the substantial number of values; (d)(3) forecasting a mean and variance at an appropriate lead using the updated model; (d)(4) calculating a new cutoff value based on a new current target value, wherein the new cutoff value is calculated as a point of truncation of a normal distribution having the forecasted mean and variance such that the mean of the truncated distribution is equal to the new current target value; (d)(5) determining if a current new value is above or below the new cutoff value; (d)(6) making a segregation decision based on the determination; (d)(7) repeating steps (d)(1)–(d)(6) until a substantial number of new values are taken; and (d)(8) substituting the substantial number of new values for the substantial number of original values forming the minimum number of values in step (b) and substituting the updated model for the existing model prior to repeating steps (c)–(f).

BRIEF DESCRIPTION OF THE DRAWING FIGURES

FIG. 1 is a schematic diagram showing one arrangement or environment in which the segregation methods disclosed herein may find significant utility;

FIGS. 2*a* and 2*b* graphically illustrate the nature of the segregation function;

FIG. 3 graphically shows the manner in which the cutoff value, $z_c$ is obtained;

Figure 7:
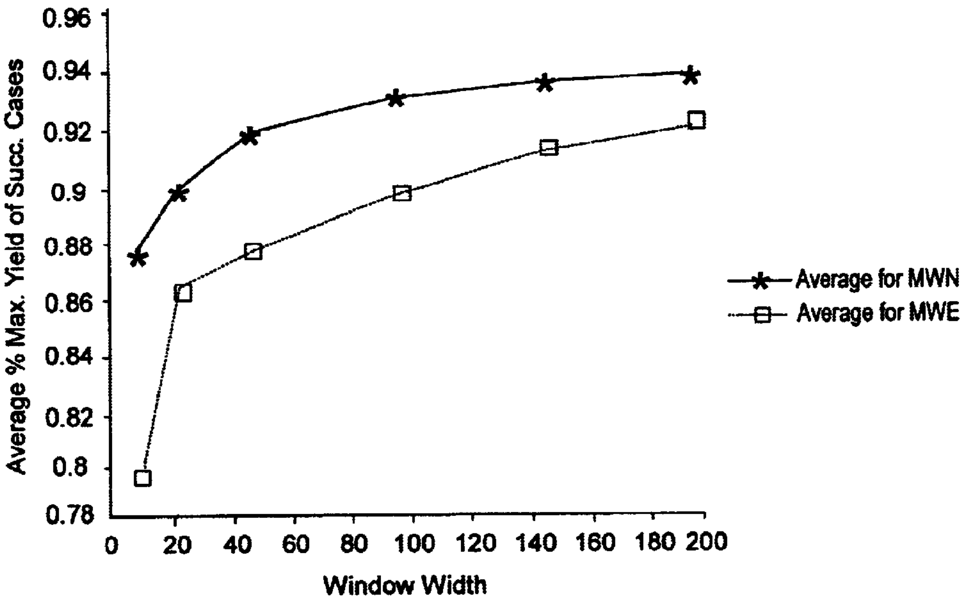
Figure 8A:
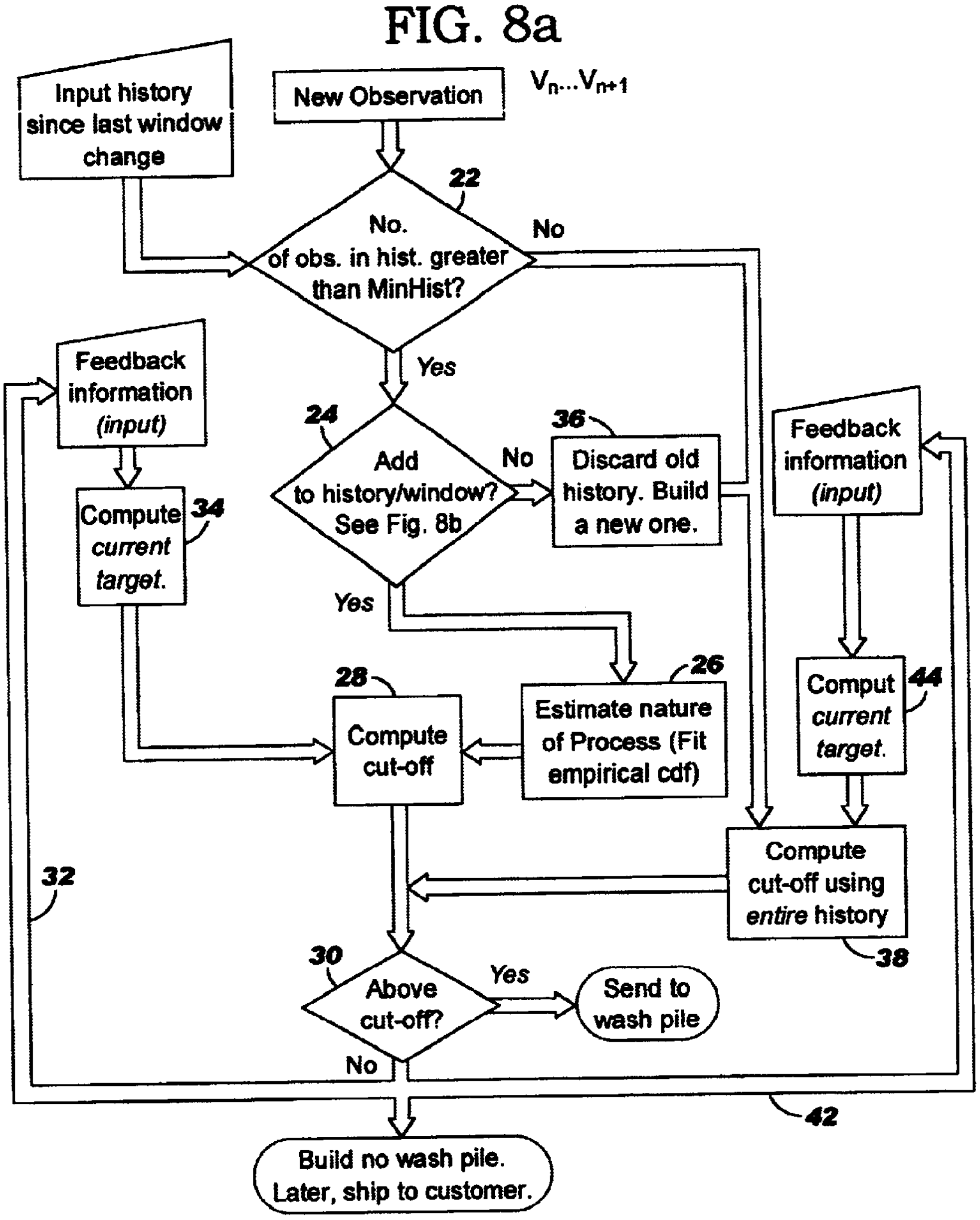
Figure 8B:
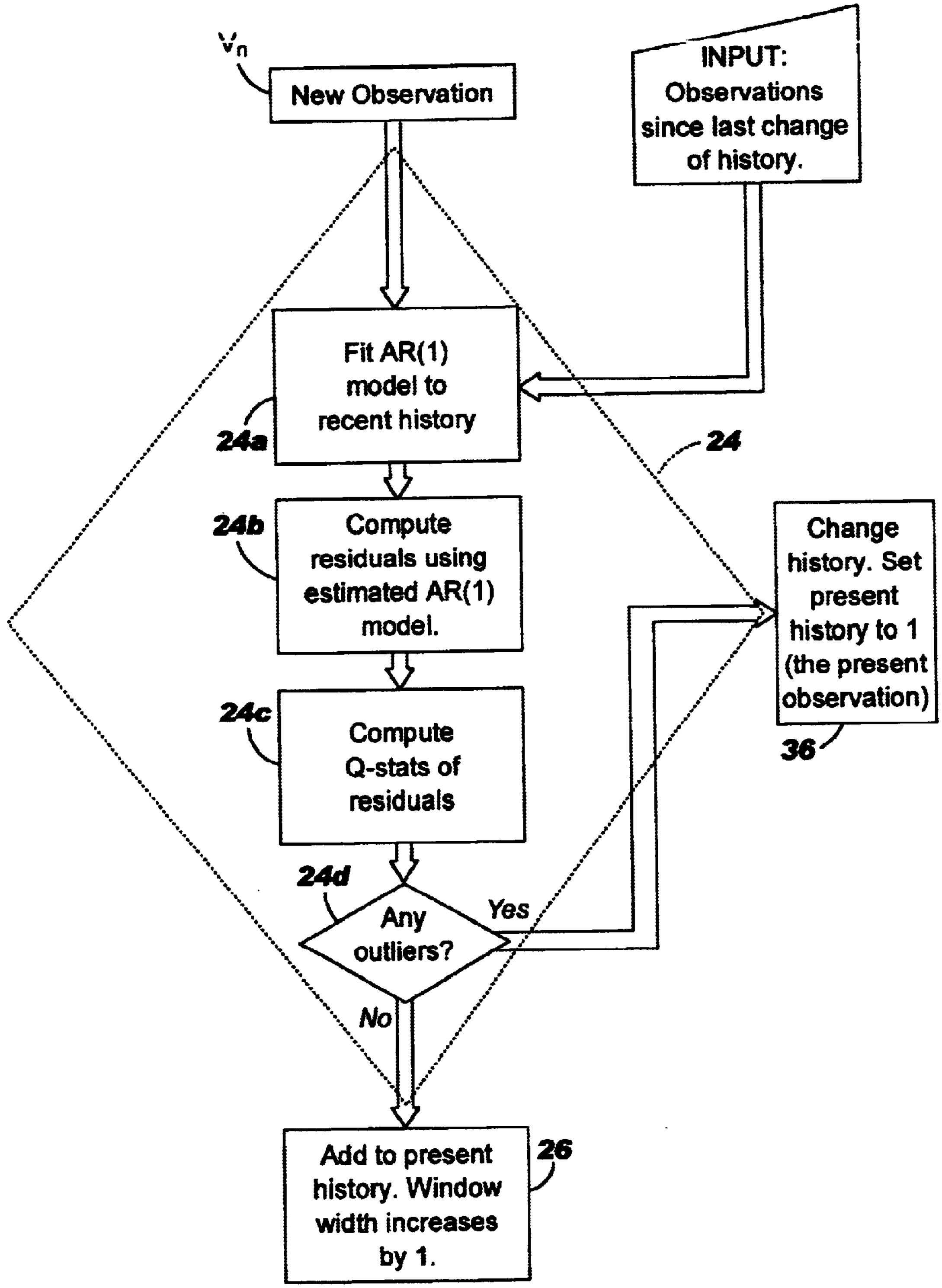
Figure 9:
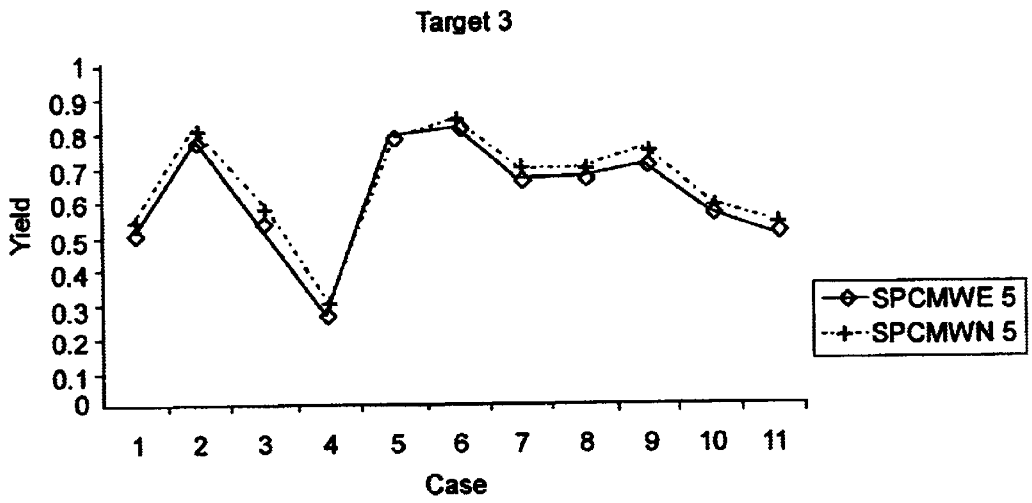
Figure 9:
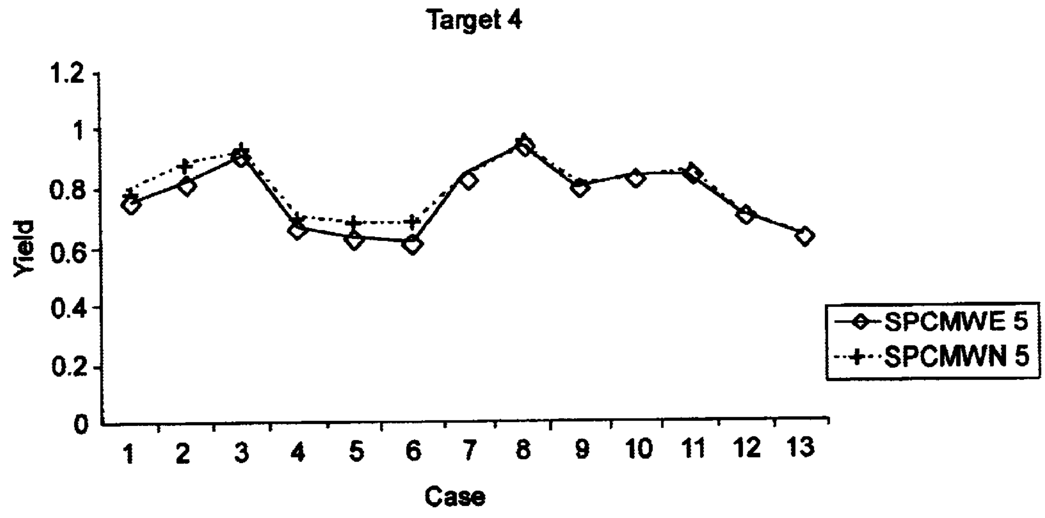
Figure 10:
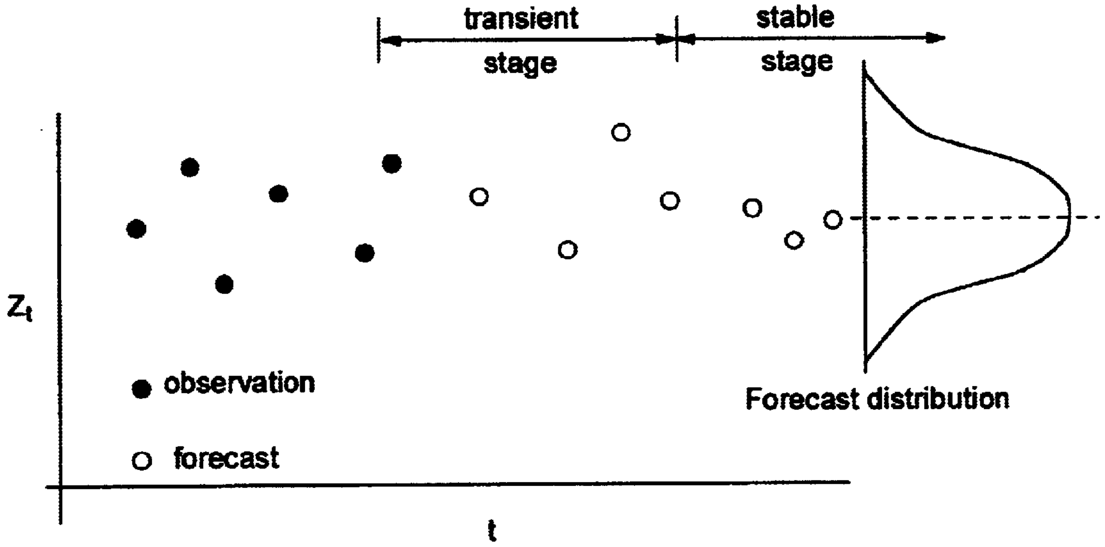
Figure 11A:
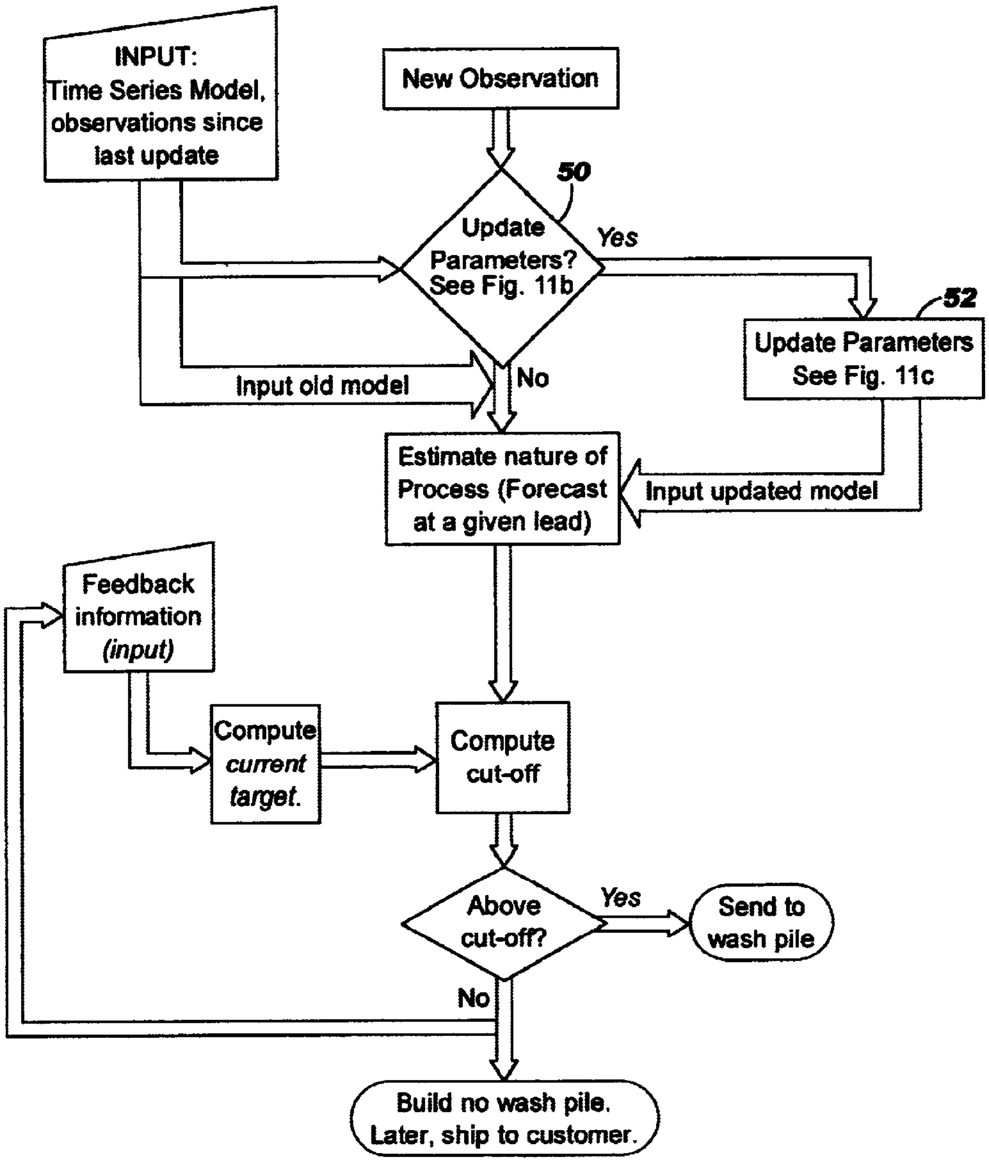
Figure 11B:
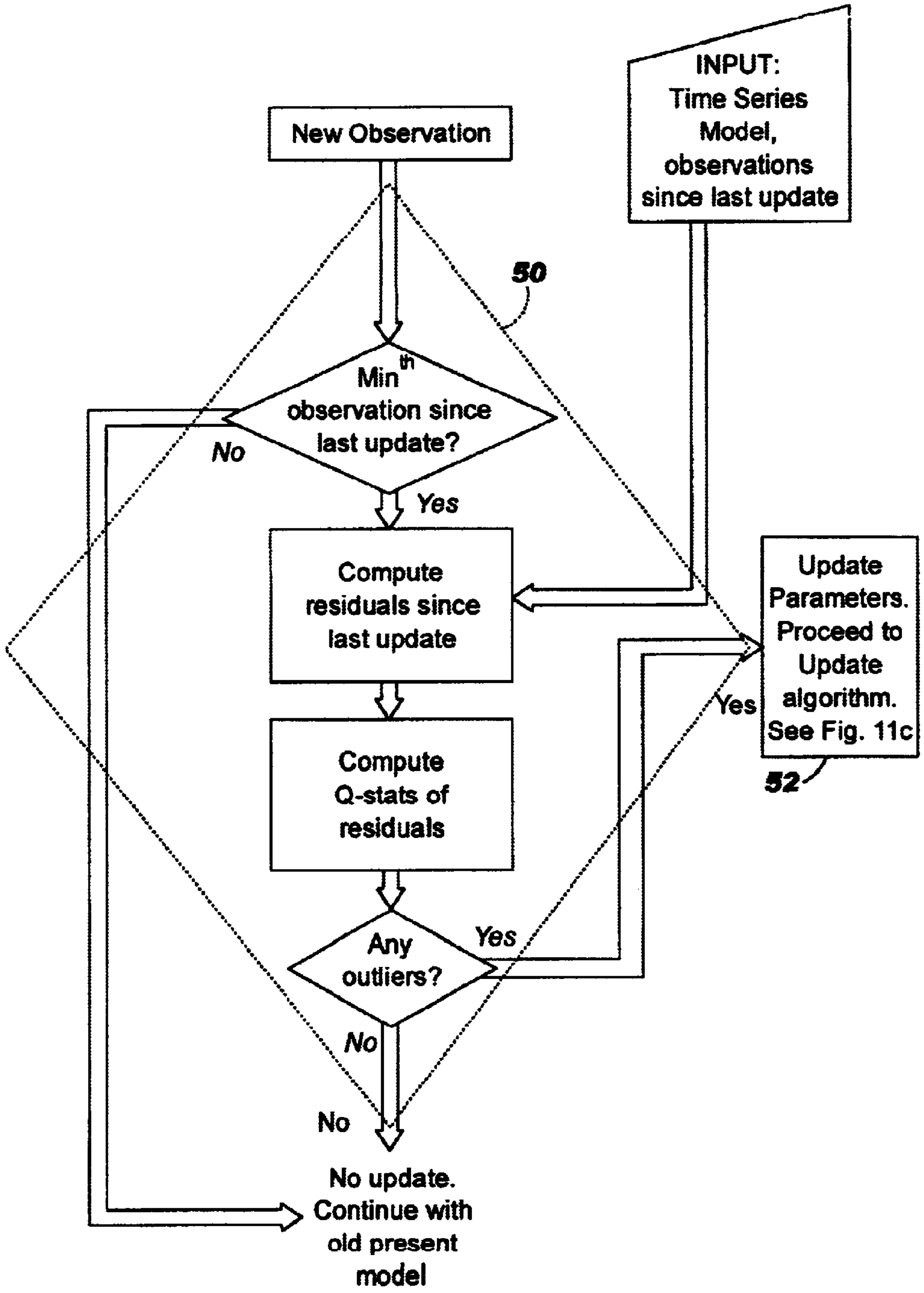
Figure 11C:
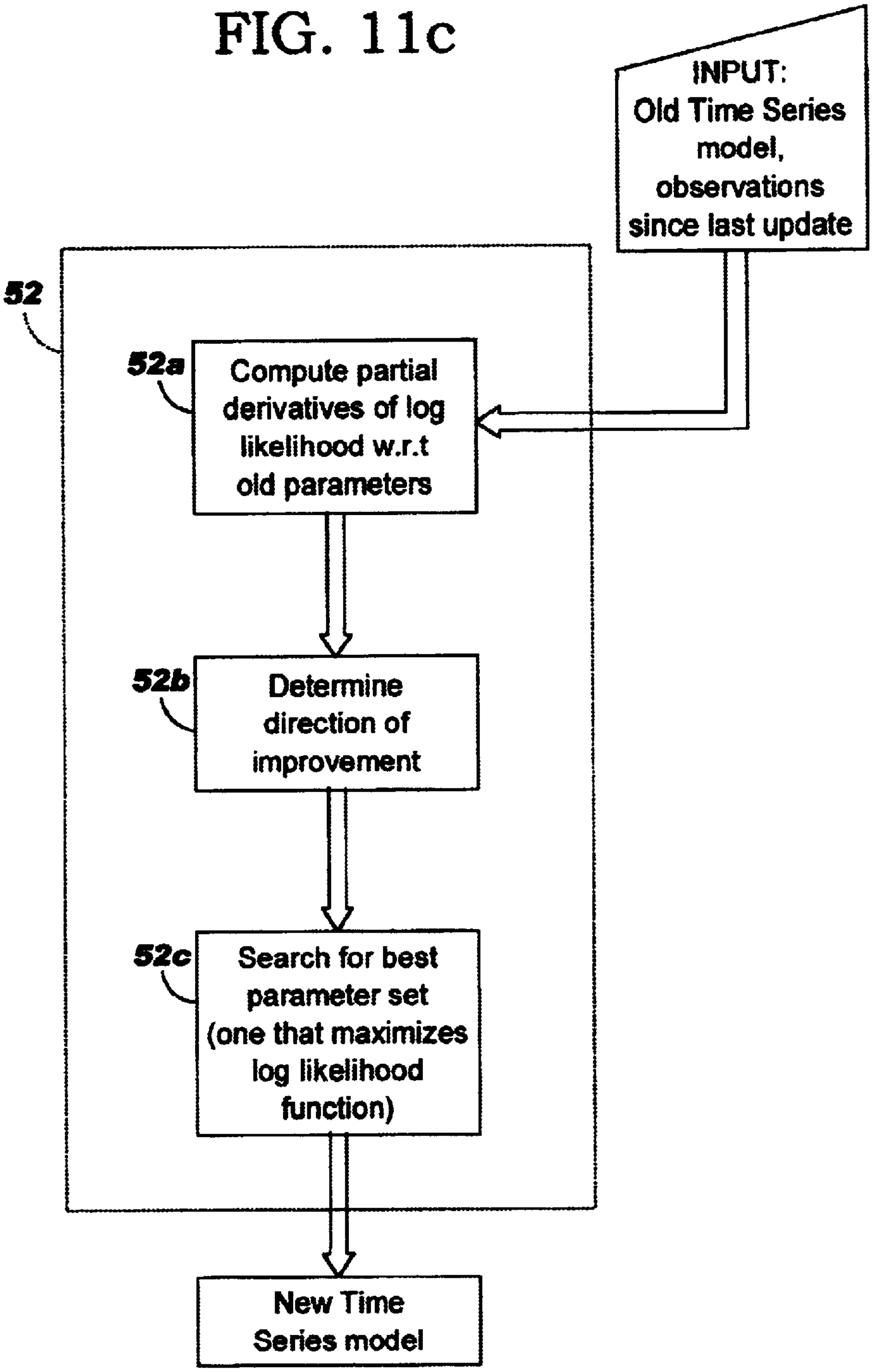
Figure 12:
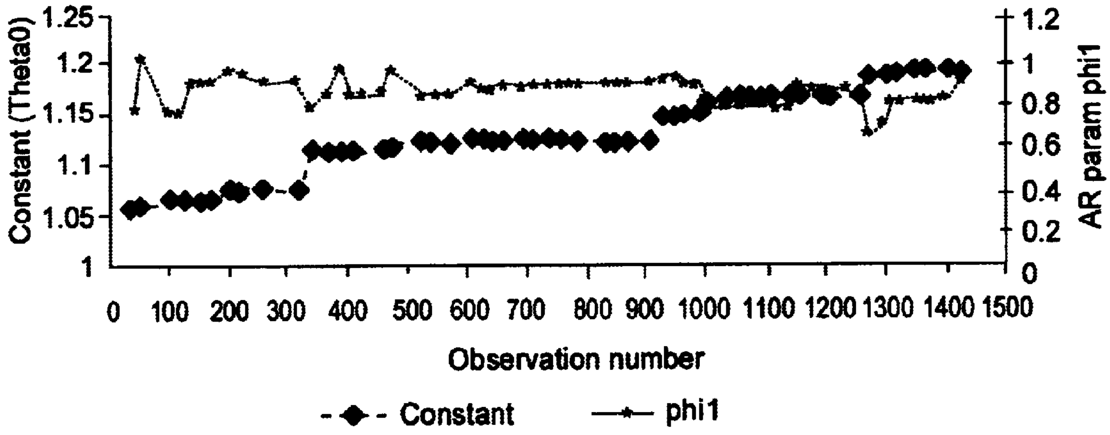

FIG. 7 graphically illustrates the comparison of the yields for the various window widths using the moving window methods;

FIG. 8*a* is a flowchart showing the moving window method including the implementation of Statistical Process Control techniques;

FIG. 8*b* is a flowchart showing the steps involved in performing Statistical Process Control;

FIG. 9 graphically illustrates a comparison between SPC-MWE and SPCMWN with a window width of five for Targets 3 and 4;

FIG. 10 is a graph showing the nature of a time series model;

FIG. 11*a* is a flow chart illustrating the time series method;

FIG. 11*b* shows the procedure for deciding whether a process change has occurred;

FIG. 11*c* shows the procedure for updating the model if a process change has occurred; and FIG. 12 shows the change in model parameters over time.

DETAILED DESCRIPTION OF THE INVENTION

The present invention includes a plurality of methods for segregating a mineral, such as coal, into different fractions. As compared to prior art industrial segregation algorithms, the methods disclosed herein are in most cases capable of adapting to non-stationary conditions (i.e., where the distribution of coal quality shifts over time in an unpredictable manner). This results in more practical control strategies with higher performance than previously possible, but without introducing any significant effort or expense into the overall segregation process.

Figure 1:
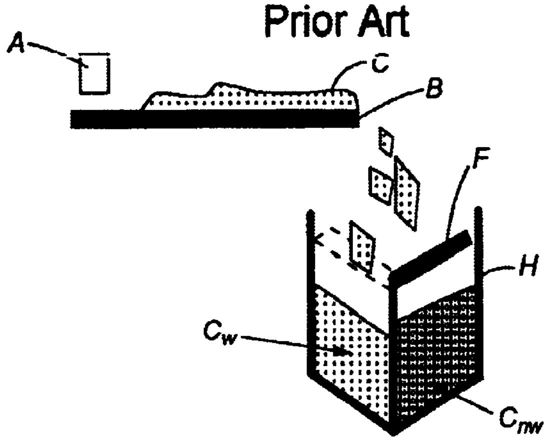
FIG. 1 Prior Art

FIG. 1 illustrates one environment in which the segregation methods of the present invention may have significant utility. Reference character C is directed to an r.o.m. coal stream being carried on a conveyor belt B. An analyzer A is positioned adjacent to the belt B. Typically, the analyzer A is an online analyzer for measuring the level of a parameter (e.g., ash content) of a segment of the passing coal stream at certain time intervals (e.g., every five seconds). After online analysis, the stream of coal C may exit the belt B and, in the illustrated embodiment, fall into a storage bin H including a flop gate F. Depending on the position of the flop gate F, the coal C is directed to the wash fraction or pile, represented as $C_w$, or the no wash fraction or pile, represented as $C_{nw}$. It should be appreciated that this particular arrangement is shown and described only to illustrate one particular environment in which the methods of the present invention can be used to make segregation decisions. The use of other equivalent or known arrangements for segregating coal into two or more fractions is also possible.

Figure 2:
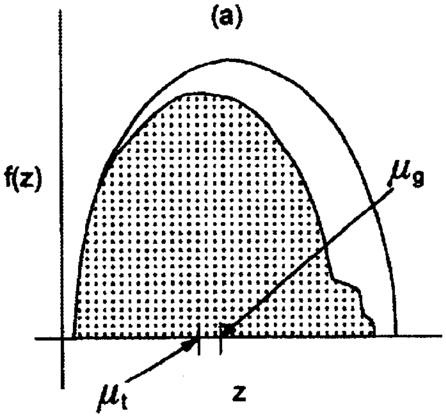
Figure 2:
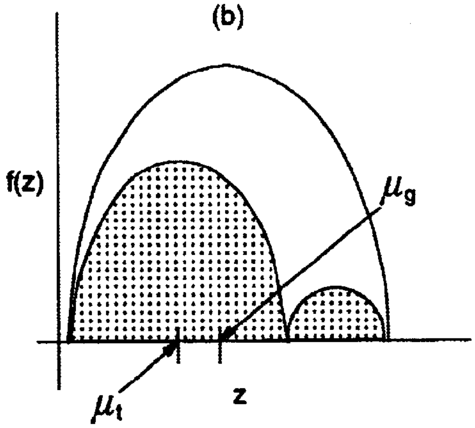

To make segregation decisions, it is necessary to establish a cutoff value given the present state of the passing coal stream, which is referred to herein as the "process." Based on the cutoff value, a decision is made whether to send a particular block or segment of coal to the wash or no wash pile. To estimate the cutoff, it is assumed that the distribution of quality z of r.o.m. coal being produced to meet a particular shipment is given by the density function $f(z)$, shown as a continuous line in FIGS. 2*a* and 2*b*. This distribution represents the entire batch of r.o.m. coal produced for that shipment, which is of course not known at the beginning of production. Rather, it takes shape at the end of the production period, and is hence called the ultimate histogram. In these figures, the average grade of the coal produced for that shipment is represented as $\mu_g$ and the target is represented as $\mu_r$. As should be appreciated by one of skill in the art, there are several ways to segregate the entire batch of coal to meet the target. Indeed, two such ways are shown in the figure as dashed lines, which are called segregation functions, g(z). In practice, these segregation functions are used to decide whether a particular block or segment of coal should be accepted or sent to the wash pile. The function g(z) lies between 0 and 1 for all quality levels and for a particular level it represents the fraction of coal that is sent to the no wash pile (i.e. accepted). For example, if for z=8% ash, g(z)=0.45, it implies that 45% of 8% ash coal is accepted. Therefore, the gray areas (the area under the f(z)·g(z) curve) in FIGS. 2*a* and 2*b*, indicate the distribution of coal in the no wash pile for the two segregation functions. For the customer, it does not matter which segregation function is chosen, as both meet the target. However, for the coal producer, the preferred segregation function is the one that produces the highest yield while still meeting the target.

The segregation functions can be mathematically represented as:

$$g(z) = \begin{cases} 1; z \le z_c \\ 0; z > z_c \end{cases}$$

where $z_c$ is the cutoff value, and is the root of the equation:

$$\frac{\int_{-\infty}^{z_c} zf(z)\,dz}{F(z_c)} - \mu_t = 0$$

Figure 3:
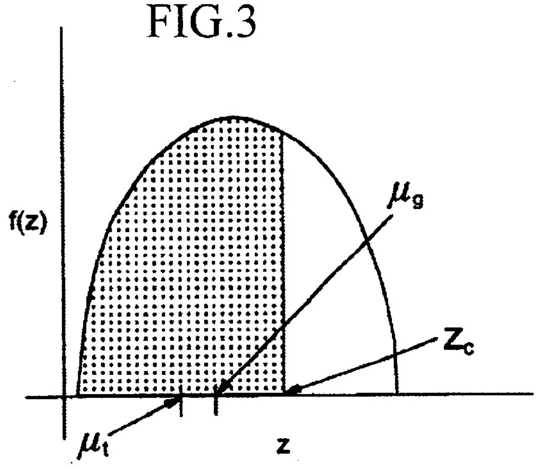

To obtain the best segregation strategy, the ultimate histogram is truncated so that the mean of the truncated portion is equal to the target $\mu_t$. This is depicted in FIG. 3.

In practice, the ultimate histogram is not known beforehand. Instead, it is developed over the production period dedicated to making that shipment of coal and, thus, changes its statistical nature over time. As a result, coal quality levels for different periods have different characteristics, and for any given instant in time can be characterized by a local histogram.

Since the ultimate histogram cannot be predicted, if a segregation decision is made at any time that is the best for that instant, then reasonably good overall performance is expected. The segregation decision is made at that instant by truncating the local histogram such that the mean of the truncated portion is the current target value. The current target value, in turn, is defined as the average quality level that future blocks of coal must meet so that the entire shipment meets target. It reflects the current average quality level of the no wash pile and is obtained by balancing the current quality of the no wash pile with the quantity of coal expected to be sent to the no wash pile in the future and the target average quality of that coal. The quantity of coal expected to go into the no wash is estimated from the prior history. An example computation of the current target value is as follows:

| | |
|---|---|
| Customer Specification: | 8.0% ash |
| Total Tons Mined to Present: | 500 |
| Tons sent to No Wash: | 300 with a mean of 8.6% ash |
| Historical Proportion of Coal Sent to No Wash: | 300/500 = 0.60 |
| Assumed Future Production: | 1000 tons |
| Tons Expected to go to No Wash in the Future: | 0.60 × 1000 = 600 |
| Expected Total Tons in No Wash at the End of Shift: | 300 + 600 = 900 |
| New Current Target: | $\frac{900 \times 8 - 300 \times 6}{600} = 7.7\%$ |

With this segregation decision procedure, the expected value of each block of coal placed in the no wash pile is the current target value. As evidenced by the experimental results that follow, this segregation decision strategy enables good target control for large coal batches by successfully characterizing the current stochastic nature of the process.

Figure 4:
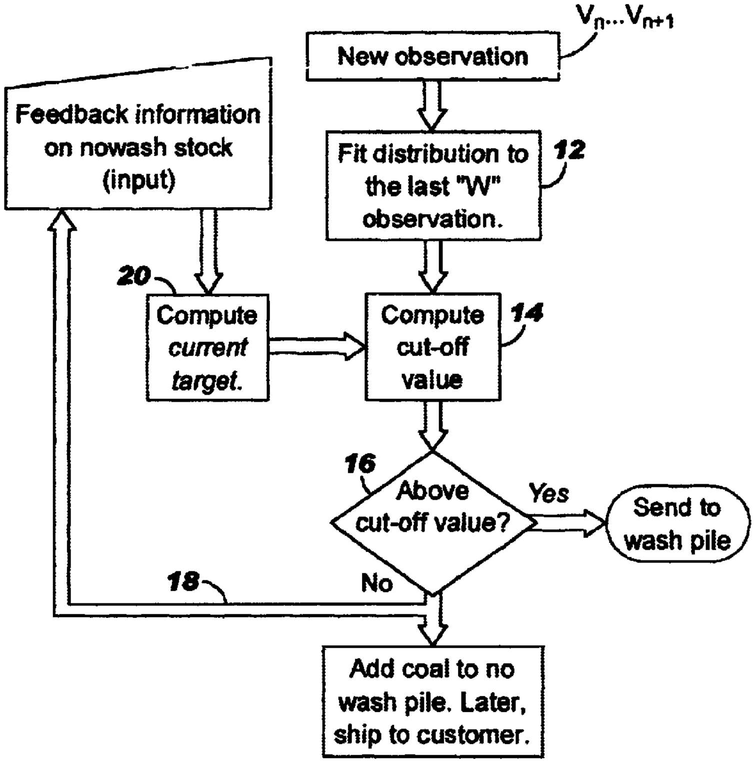
FIG. 4 is a flowchart showing the basic steps for practicing the moving window methods disclosed herein.

To obtain the statistical description of the new values realized at the present time, it is first necessary to identify observations that are indicators of the present nature of the process. Obviously, observations from the immediate past are the best indicators of the process. Thus, in practicing the method in its broadest aspects, a constant arbitrary number of data values obtained from the immediate past are chosen as being relevant to the present state of the process. As shown in the flowchart of FIG. 4, this constant minimum number of data values used in estimating the nature of the process is known as the window width W. For example, if the window width was 50 and the present time t, then data values obtained from t−49 to t are assumed to contain information on the present process. At time t+1, data values observed from t−48 to t+1 are assumed relevant (i.e., the newest observation replaces the oldest observation). Then, for every subsequent block or segment of coal seen by the analyzer, a newly observed value $V_n$ is taken and the nature of the process is obtained by fitting an empirical distribution, block 12, to the window W. As shown in block 14, the cutoff value is then computed, as explained earlier, by truncating the empirical distribution such that the mean of the truncated portion is equal to the current target (with the point of the truncation serving as the cutoff value $z_c$). Then, based whether the newly observed value $V_n$ is above or below the cutoff value $z_c$, the segregation decision is made, as indicated in decision block 16. If the observed value is below the cutoff value $z_c$, and thus the segment of coal is sent to the no wash pile, the observed value is used in a feedback loop 18. Then, prior to observing the next block or segment of coal (not shown), the current target is updated, block 20, to account for the past value $V_n$ obtained. A new cutoff value $Z_c'$ is then computed at block 14 for that block or segment of coal, for which a new value $V_{n+1}$ is obtained from the online analyzer and compared with this cutoff value to make the segregation decision at block 16. A basic flow chart for this method, termed "Moving Window Empirical" (MWE), is shown in FIG. 4.

To test the viability of the method experimentally, data was collected from an underground coal mine in Ohio. The mine frequently ran two sections (a high ash section and a low ash section), but would also run one section at a time. The online analyzer in the mine scanned the r.o.m. coal constantly and every five seconds gave an average ash value for the coal scanned. For the belt speed and loading at the mine, each such reading corresponds to approximately one ton of coal. Of course, is it also possible to vary the sampling such that values are taken at different time intervals for different amounts of coal (i.e., every ten seconds for two tons, etc.), or to vary the speed of the conveyor belt carrying the coal stream to increase or decrease the amount of coal passing in a given time interval.

Figure 5:
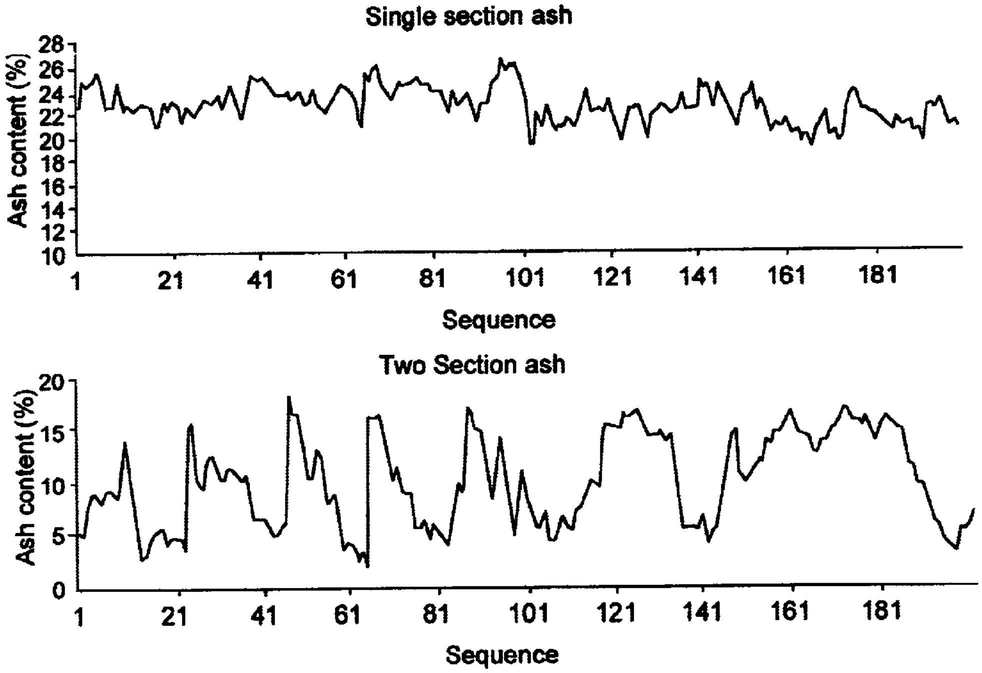
FIG. 5 is a graph showing the difference in ash values for a one section and two section coal stream.

During the experiments, thirteen sets of data values were collected from the mine. Each set of data values was different in length, but each corresponded approximately to a single shift of production. Ten of the data sets were collected when the mine was running a single section (low ash or high ash), while three were collected when the mine was running both sections. As can be expected, the ash values varied considerably when both sections were running compared to when just one section was running. This is exhibited graphically in FIG. 5.

To test for the effect of window length, the data sets were segregated at six different window widths, including windows having 10, 25, 50, 100, 150 and 200 values. Also, to maximize the use of the data sets, each was segregated four times to meet four different target values. Using the data sets in this manner resulted in segregation of a total of 90,756 tons of coal. The targets were termed Target 1, Target 2, Target 3 and Target 4, with Target 1 being the smallest in magnitude and Target 4 the greatest. However, Target 1 in one data set was not necessarily the same as Target 1 in another data set. For example, a first data set may have been segregated to meet targets of 6.00, 7.00, 8.00 and 9.00 percent ash contents, while a second data set was segregated for targets of 5.00, 6.00, 7.00 and 8.00 percent ash. However, the percentile of the data set that averaged below a certain target level in one data set was approximately the same as in another data set. For example, if 25% of one data set could be segregated to meet a target of Target 1 (6.00 in the example), then in the second data set, approximately 25% of the data could be segregated to meet the corresponding Target 1 (5.00 in the example). This was done to allow comparison of results for various targets, and the method was considered successful if the segregated coal met customer target.

Figure 6:
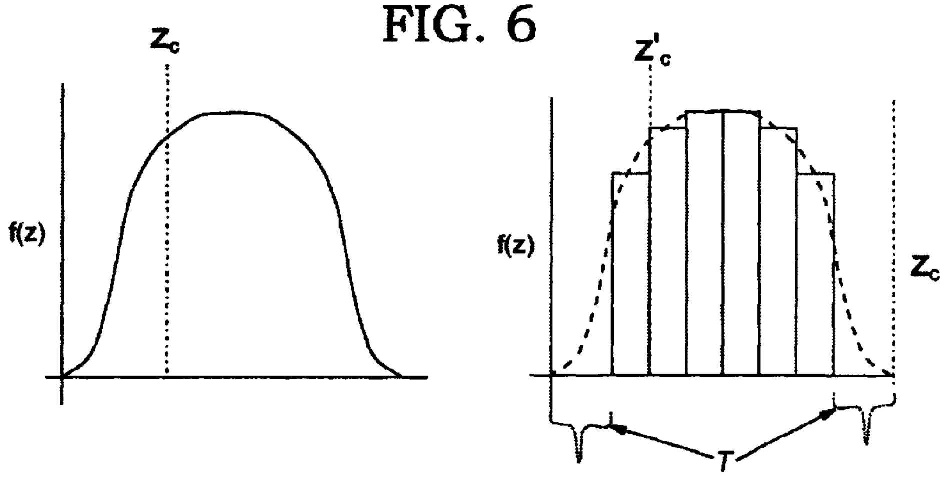
FIG. 6 illustrates the differences between the actual and the empirical distribution for a given data set.

Based on the experiment, it was discovered that the basic method generally achieves target in both single and double section data sets. Window width (that is, the number of data values used in the distribution) had little effect in the success of the method in meeting target, with the smaller windows working for about the same number of cases as large windows. When the targets were small, small windows did not perform well. This is because when an empirical distribution is fitted to a small number of observations, the tails are not properly estimated as they get clipped off (see reference character T in FIG. 6). Small targets represent the lower tail of the data set. Since the tail gets clipped off, the good quality coal (the lower tail) is not represented properly, thus resulting in poor yield. Larger window widths also tended to create a higher yield.

To better estimate the tails, an alternate embodiment of the method uses a normal distribution instead of an empirical distribution. A normal distribution was estimated from the window W of original data values (i.e., the mean and the variance were computed from the window), but the remainder of the method was practiced as described above for MWE and shown in FIG. 4. This method was called Moving Window Normal (MWN), since it uses normal, rather than empirical distribution.

Experimentation confirmed that MWN worked in both single and double section data like MWE, and in fact, yield improved over MWE when MWN was successful. FIG. 7 graphically illustrates the comparison of the yields for the various window widths. In the graph, the cases where both MWN and MWE were successful are identified. For each successful case, a ratio of the actual yield to maximum possible yield was taken. The maximum possible yield was obtained by truncating the sorted data set so that the truncated portion had a mean ash equal to the target ash. In real life this is not possible, as the entire data set is not known a priori. This ratio was averaged for each window size and formed the Y coordinates of the data points of the plot. MWE also exceeded the yield for MWN for some cases of large window widths. This is because when the windows are large, it is possible that they contain observations from several distributions, and forcing a single normal distribution causes errors. However, MWN had difficulties in meeting the target as window width increased. This is the result of forcing a single distribution to fit non-stationary data. However, when MWN did work, yields were high. This is because the estimation of the local distribution would be better when wide windows are used if the process is stationary. Finally, like MWE, MWN was not successful in meeting low targets.

One limitation of MWE and MWN in their most basic forms as described above is that the window width is kept constant. Depending on the window width selected, the estimation of the process provided by the distribution could be right or wrong. This is seen in Table 1 where the target of 22.00 is not met with a moving window of 25, while it is met with a moving window of 50:

TABLE 1

Effect of window width on target control.

| | Target: 22.00 | |
|---|---|---|
| | Window = 25 | Window = 50 |
| Mean of No wash | 22.325 | 21.966 |
| Achieved Yield | 0.150 | 0.226 |
| Maximum Yield | 0.305 | |

It should be appreciated that when the target value is not met, the yield is effectively zero, since that coal must be washed or blended with higher quality coal before it can be shipped. Constant window widths do select the recent history of the process in order to estimate the current process, but given the unpredictable performance for any given window width, it is desirable to include a longer history if the process is stable and less if it is changing. Thus, an alternative approach is to vary the window widths according to changes in the process.

To allow for the window width to vary, Statistical Process Control (SPC) techniques were combined with the MWE/MWN methods. As is known in the art, when several observations are grouped together into a single window, it implies that all belong to a homogenous group and the process that produced the observations is stable for that interval. When a new observation is realized, instead of arbitrarily discarding the oldest observation to make room for the new one, it is possible to determine whether the new observation is a reasonable or "likely" occurrence from the process represented by the window. If it is, then the new observation is included into the existing window, thereby increasing its width by one. Increasing the window width when the process does not change increases the estimation accuracy, as compared to discarding useful information in an effort to keep the window width constant. If the new observation was not a reasonable occurrence, or "not likely" based on the current model, then it is assumed that the process had changed. As a result, the entire window is discarded and a new one is built, starting with the latest observation. Thus, adjacent windows may have varying widths.

In implementing SPC, an assumption on the nature of the process is required. Specifically, it is assumed that all windows of data values are first order autoregressive or AR(1) in nature (which experimentation later revealed was a reasonable fit for most cases) and can thus be modeled on this basis (note that an assumption of independence is inappropriate, since the data are strongly correlated over time). The "new value" obtained (that is, the observation realized at the current time) is then tested to see if it is a reasonable occurrence from the AR(1) model described by the window. In the most preferred embodiment, the AR(1) model is represented by the equation $z_t=c+\phi z_{t-1}+\epsilon$, where $z_t$ is the ash value at time t, c is a constant, $\phi$ is the autoregressive coefficient, and $\epsilon$ is a white noise term, and c and $\phi$ are the parameters that are estimated. The determination is then made using the following steps:

(1) Estimate the parameters of the AR(1) model from the present window.

(2) Compute residuals from this model. For a time t, the residual $e_t$ is given by $e_t=z_t-\hat{z}_t$, where $\hat{z}_t$ gives the ash value estimated for time t.

(3) Sequential Q-statistics are computed for the residual mean and variance. A detailed description of the method used is provided in Quesenberry, C. P., SPC Methods for Quality Improvement, John Wiley and Sons, 1997, the disclosure of which is incorporated herein by reference.

(4) If a Q-statistic fails the 99% hypothesis test for either the mean or variance of the residual, then a process change is indicated and accordingly, the old window is discarded. A new window is then built starting with the new value (i.e., the present observation).

In the above procedure, when the old window is discarded, the new window has a width of one (the present observation). Since it is not possible to estimate a distribution from one observation, the segregation decisions cannot be made with this newly observed value alone. However, since segregation occurs in real-time and a decision must be made for each block or segment of coal, an empirical distribution is fitted to at least a certain number of minimum values from the immediate past, and preferably the entire history of values from the inception of the method. This distribution is then used for making segregation decisions. This substitution is done until the window width increases to a preselected new width (or new minimum history, MH). In other words, the test for process change is not executed when the window width is below a preselected number of values required to create a minimum history. Thus, new realizations are added to the window without testing for a process change (that is, without testing to see if the value is likely based on the AR(1) model). The test for process change is resumed as soon as the window width equals the minimum history and, therefore, subsequent realizations are added to the window if they are deemed consistent with the AR(1) model represented by the window. In a most preferred embodiment, the preselected new width is at least five, and in the experiments described below, a value of fifteen is also used. Once the appropriate window of data values is determined, the method proceeds the same way as MWE/MWN. When an empirical distribution is fitted to the window, the method is termed SPCMWE, and when a normal distribution is used, SPCMWN.

FIGS. 8*a* and 8*b* give the flow chart for the SPC based methods. For a newly obtained value $V_n$, at block 22, a test is first conducted to determine whether the number of observations forming the history of values is greater than a preselected minimum number (termed MinHist in block 22). In the initial case, it is assumed that a certain number of observations have been previously made to provide the minimum history. If the minimum history criteria is met, the method proceeds to determine whether the new value should be added to the history/window W at block 24. This involves determining whether the value is likely based on the current nature of the process using the AR(1) model described above (see FIG. 8*b*). More specifically, as shown in block 24*a*, the AR(1) model is fitted to a certain number of recent values from the history. Then, at block 24*b*, residuals are computed using the AR(1) model developed in block 24*a*. The Q-statistics of the residuals are then computed at 24*c* and a determination is made as to whether any outliers exist at step 24*d*. If the new value $V_n$ is not an outlier (i.e., likely based on the current model), it is added to the minimum history. This increases the window width W by one value.

Then, the method proceeds as previously described, with the data values comprising the window being used to estimate the nature of the process at block 26. The cutoff value is then computed at block 28, as twice explained above, using either an empirical or normal distribution. Then, based on whether the newly observed value $V_n$ is above or below the cutoff value $z_c$, the segregation decision is made at decision block 30. If the new value obtained is below the cutoff value $z_c$, the segment of coal is sent to the no wash pile, and this new value is used in a feedback loop 32. Then, prior to observing the next block or segment of coal (not shown), the current target is updated at block 34 to account for the new value $V_n$ obtained. The process is then repeated, with the window growing in width for each new value that is determined to be likely based on the existing model.

Turning back to block 24*d*, if the new value is an "outlier" (that is, it is not considered likely based on the process at that given instant), then the method proceeds discard the entire window and build a new window using the new value as a first value, as shown at block 36. The cutoff value $z_c$ is then computed using at least the minimum history in the case of the first instance where an outlier is detected, and most preferably the entire history taken since the inception of the method, as shown at block 38. This cutoff value 38 is then used to make the segregation decision based on the current new value obtained at decision block 30. Feedback on this value is then provided via loop 42 to compute a new current target at 44.

As should be appreciated, upon observing a new value $V_{n+1}$ (now shown), the decision at block 22 is "no," since the number of values in the minimum history is only one. Thus, the method again proceeds to block 38 to compute the cutoff value using at least the minimum history (initial case), and preferably the entire history (for all other cases). The same procedure is repeated until the number of values in the current window is greater than the required minimum history, at which time the testing for whether a process change is occurring recommences.

Through experimentation, it was discovered that SPCMWE with a minimum history (MH) of 5 is robust in two section data and worked in 46 out of 52 cases (13 data sets segregated to meet 4 targets each) yielding 51551 tons out of 90756 tons. SPCMWE with MH of 15 worked in 43 cases yielding 49319 tons. It was also noted that this method was more likely to fail for smaller target values. Additionally, the window widths were tracked as segregation proceeded to see how the window lengths varied, and it was found that most window widths were small (less than 20).

For two section data, the SPCMWE method failed when the MH was increased to 15. When the MH is increased, coals from two sections are forced into one large window causing errors, thus explaining the failure. On the contrary, when the coal is from a single section, larger windows should give better estimates of the process. This was seen in the improved performance with MH of 15 in single section data.

Similar conclusions for SPCMWN were reached based on experimentation. Specifically, the use of normal distribution increased the yield to 55035 for a MH of 5, and to 54911 for a MH of 15. Hence, the normality assumption tends to result in higher yield than when an empirical distribution is used. However, the number of cases where it worked reduced to 44 from 46 for MH of 5 and to 41 for a MH of 15. For large targets (Targets 3 and 4), the performances of SPCMWE and SPCMWN are not much different (see FIG. 9).

In addition to testing the viability of the methods discussed thus far (i.e., SPCMWE and SPCMWN), a comparison with a known industrial algorithm was made. A detailed description of the particular industrial algorithm used is found in Ganguli, R., Algorithms for Physical Segregation of Coal, Doctoral Dissertation, Department of Mining Engineering, University of Kentucky (1999), the disclosure of which is incorporated herein by reference. In the experiment, the industrial algorithm was applied to segregate the same 90,756 tons of coal for the same targets. However, the industrial algorithm could only send a total of 13,921 tons to the no wash pile without jeopardizing the target. It also failed to meet target in many more cases than the algorithms in this paper. Moreover, as shown in Table 2, SPCMWE and SPCMWN out performed the industrial algorithm even when it was successful:

TABLE 2

Comparison of Various Segregation Methods

| Algorithm | # of successful cases | Tons yielded | Savings at $5/ton |
|---|---|---|---|
| Industrial Algorithm | 26 | 13921 | — |
| SPCMWE (MH = 5) | 46 | 51551 | 188,150 |
| SPCMWE (MH = 15) | 43 | 49319 | 176,990 |
| SPCMWN (MH = 5) | 44 | 55035 | 205,570 |
| SPCMWN (MH = 15) | 41 | 54911 | 204,950 |

The results of the experiments are summarized below:

(1) The MWE/MWN methods are simple but robust segregation algorithms. Success depends on the window width picked, but no particular width resulted in consistently high performance.

(2) The SPCMWE and SPCMWN methods automatically adjust window widths. Therefore, no guessing is involved.

(3) Although yields for the best window width using the moving window methods was comparable to the yields using SPC methods, there is no way to determine the best window widths a priori. Hence, as a practical matter, yields for the SPC based methods, which dynamically and automatically determine window width, should be higher than for the moving window methods.

(4) Use of the normal distribution improved yield relative to the empirical distribution. This occurs because a selection of form of the distribution makes it easier to estimate the distribution if that selection is appropriate. At the particular mine used in the experiments, a normality assumption was reasonable.

(5) A MH of 5 works better for two section data, while a MH of 15 works best for single section data. This is expected since more frequent updating is desirable in the two-section case.

(6) All developed algorithms are robust in two section data, which is generally regarded by the mining industry as a difficult situation for the application of segregation technology. For a given range of difference in quality levels among the selections, a two-section mine would, in fact, tend to exhibit higher variability than three or more section mines.

As an alternative to the methods described above, and as part of the present invention, the use of other time series models is proposed for making segregation decisions. In contrast to the methods described above, time series models directly accommodate the auto-correlated nature of the coal quality levels when estimating parameters to characterize the process. Moreover, such methods may also: (1) provide forecasting capability that is useful in segregation control; and (2) extend to applications where quality targets are to be maintained over small batches of coal (homogeneity control), whereas the other methods described above best apply to large batch quality targeting.

As explained above, one method of making segregation decisions involves estimating the stochastic nature of r.o.m. coal quality by using an empirical or normal distribution based on past values obtained from an analyzer, termed windows. In one method, the window widths (i.e., the number of values used to estimate the nature of the process) are continuously changed using Statistical Process Control techniques (SPC). As a result, the estimation reflects changes in the statistical nature of the r.o.m. coal quality that have been detected from the online measurements. A segregation decision, which is based on a cutoff value, is made for every block or segment of coal depending on the estimated distribution. Any blocks or segments with quality lower than the cutoff value are sent to the wash/reject pile, while those that are equal or better in quality are sent to the no wash pile. The cutoff value is computed by truncating the estimated histogram such that the mean of the truncated portion was equal to the current target value. This current target value, which reflects the changing nature of the no wash pile, is the average quality level future blocks of coal added to the no wash pile must meet for the entire no wash pile to meet the customer specification. As demonstrated through experimentation, the use of this statistical approach resulted in considerable success, since the methods in practice yielded much more coal in the no wash pile than the industrial algorithm and met target even when the coal production came from different sections in the mine where quality levels varied substantially. In contrast, when the mine production came from two or more sections, so that the coal on the conveyor was a random mixture of coals of various qualities, the industrial algorithm failed.

To describe the time series method disclosed herein, some background on the overall concept of time series models is first provided. A set of observations in time sequence is defined as a time series in Box, G. E. P., Jenkins, G. M. and Reinsel, G. C., Time Series Analysis: Forecasting and Control, $3^{rd}$ ed., Prentice Hall, Englewood Cliffs, N.J. (1994), the disclosure of which is incorporated herein by reference. In some processes, these observations are correlated. A good example of a correlated time series is the values obtained by the online ash analyzer. As explained in Sargent, D. H., Woodcock, B. A., Vaill, J. R. and Strauss, J. B., Effect of Physical Coal Cleaningon Sulftir Content and Variability, EPA-600/7-80-107, (NTISPB 80-210529) (May, 1980), the disclosure of which is incorporated herein by reference, the mining process translates the spatial correlation within coal formations into temporal correlation. This temporal correlation has been exploited in the past for various purposes, such as for example in Cheng, W. H., Woodcock, B., Sargent, D. and Gleit, A., 1982, "Time Series Analysis of Coal Data from Preparation Plants," Journal of the Air Pollution Control Association, Vol.32, No. 11, pp. 1137–1141 (November, 1982) and Kamada, H., Kawaguchi, H. and Onodera, J., 1986, "On the Coal Blending Process Control by Online Ash Monitors," $10^{th}$ International Coal Preparation Congress, Edmonton, Canada, pp.245–266 (September, 1986), both of which are incorporated herein by reference. Time series models may be used to describe such processes. A time series model may be viewed as a linear filter of a white noise process (i.e., an i.i.d normal random series) with a parsimonious number of autoregressive (AR) and/or moving average (MA) terms. A fundamental utility of these models is the ability to forecast the level of the process into the future, accounting for its recent history and the underlying stochastic nature. In the previously described methods of segregation, moving windows were used to characterize the process. In the time-series-based class of methods described below, forecasts from time series models are used to directly characterize the process at any given instant.

With reference now to FIG. 10, let the dark circles represent ash observations (in time sequence) of an online analyzer, and let the white circles denote the forecasts made from the present time for the next few ash values. In this figure, $z_t$ represents the ash value at time t. Forecasts from most time series can be viewed as having two stages. Short lead forecasts are erratic (transient stage) as seen in the figure, reflecting the generally strong correlation of these values with the history of the process, while the long lead forecasts are more stable (stable stage). The term lead refers to the number of steps ahead for which forecast is made. For example, lead 1 forecast gives the one step ahead forecast, while the lead 2 forecast predicts the second realization. The short lead forecasts are dependent on the immediate past and, therefore, reflect the variability of the process. The long lead forecasts, on the other hand, depend on the nature of the process reflecting the long term behavior of the system and are, therefore, more stable. The most appropriate lead to use is discussed in greater detail below.

The forecast is made in the form of a multivariate normal distribution: that is, the expected value and the forecast error of $z_t$, $z_{t+1}$, $z_{t+2}$, . . . . Depending on the forecast lead, information on the state of the process at an instant (short lead forecasts) or the long term average nature (long lead forecast) is provided. In this instance, the use of a normal distribution to characterize the process is reasonable (and was confirmed experimentally, as shown further below).

To practice the most preferred version of the method of this alternate embodiment, as shown in the flowcharts of FIGS. 11*a*–11*c*, a time series model is created to describe the values obtained by the analyzer, which in the preferred embodiment are ash values. Then, for every block or segment of coal, a forecast is made from the model to characterize the process (in the form of a normal distribution). A cutoff value is then computed for this block of coal from this distribution, depending on whether the block is sent to the wash pile or the no wash pile.

To create the time series model to be used at step 50, a substantial number of data values are first obtained. In experimenting with the time series model method, the model was initially fitted to the first 200 ash observations. These 200 observations were then discarded and each new value obtained was segregated based on the model thus created. As the algorithm segregates a new block or segment of coal, the original time series model may no longer be valid, which means that the observed coal quality levels tend to be non-stationary. Moreover, even if the process has not changed, a better estimate of model parameters is obtained using the new value. Therefore, for each value obtained, a check is conducted to see if the model needs to be updated, which is represented at decision block 50.

Updating may, in principle, be repeated for every block or segment of coal observed, as described. However, updating a time series model is a numerically intense procedure. Thus, while updating for every observation is desirable, implementation in the field is made difficult by the fact that a new data value is obtained by the online analyzer with great frequency (i.e., every five seconds). Also, it is unlikely that the model parameters undergo radical changes during the realization of a single observation.

Accordingly, to reduce the number of updates required and enhance the overall efficiency of the segregation process, SPC techniques were utilized in combination with the time series model method to determine when a model update was necessary. As explained above, SPC techniques test if the most recent observation is a likely realization of the present process. If the model was adequate, then the most recent observation is a reasonable occurrence of the process described by the existing model. If instead the test reveals that the recent observation is not a reasonable occurrence from the existing model, then the model no longer describes the process and, therefore, requires an update. In the preferred embodiment, as best shown in FIG. 11*b*, this test is carried out in the following way:

(1) An estimate of each observation ($\hat{z}_t$) is obtained using the time series model, with $z_t$ representing the ash analyzer reading at time t.

(2) Resultant residuals ($z_t-\hat{z}_t$) are computed.

(3) Q-statistics of the residuals are computed to test the stability of the mean and the variance of the residuals.

(4) If either the mean or the variance is found unstable, a need for a model update is indicated.

The observations realized since the last update are used in the test for process change as well as for the update of the model parameters. The observations before the previous update are discarded as being irrelevant to the present process.

The application of SPC techniques requires a minimum number of values or observations. The minimum number of observations, for this method, is the maximum of the minimum history and the model order. The minimum history is the absolute minimum required for SPC (usually 5). The model order for an ARMA(P, q) model is the greater of p and q. The old model is used until the minimum number of observations is realized.

As shown in block 52 of FIG. 11*c*, the model is preferably updated using the gradient based optimization method for parameter fitting, as disclosed in Hamilton, J. D., Time Series Analysis, Princeton University Press, Princeton, N.J. (1994), the disclosure of which is incorporated herein by reference. As shown in block 52*a*, the value of the log likelihood function of the old model is first computed using observations obtained since the last update, and partial derivatives of this log likelihood function are computed to obtain the direction of parameter adjustment that maximizes the log likelihood (block 52*b*). In block 52*c*, a line search is conducted in this direction to find the parameter set whose log likelihood is greater than the one computed for the old parameter set. If no such parameter set is found, then the old (existing) model is retained, and the process returns using this model. As is known in the art, for the parameter set $\tau_0$ (a vector), the $i^{th}$ parameter is updated as follows:

$$\tau_1^i = \tau_0^i + \frac{s \cdot g(\tau_0^i)}{\|g(\tau 0)\|}$$

where:

$\tau_1{}^i$ is the new parameter set $g(\tau_0{}^i)$ is the partial derivative with respect to the $i^{th}$ parameter of the log likelihood function with parameter set $\tau_0$ $\|g(\tau_0)$ is the norm of the gradient vector, and s is an arbitrarily chosen fraction.

In one embodiment, s was set to $2^p$, where $-15<p<0$.

When forecasting, a question arises as to what forecast lead to use. As is known in the art, short lead forecasts are more accurate in describing the present process characteristics and will, therefore, be better at target control. However, short leads will not maximize the yield, as they are only locally relevant. Long lead forecasts improve the yield, since they are closer to the ultimate distribution (i.e., the distribution of all coal yet to be segregated). When the ultimate distribution is truncated, so that the mean of the truncated distribution is the current target value, then the obtained yield is the maximum yield realized over the remainder of the segregation period. As previously mentioned, the ultimate histogram is known only at the end of the segregation period. Since the process is often non-stationary, the long term forecast is not always as an accurate representation of the ultimate distribution.

As also mentioned earlier, employing SPC reduces the number of updates so that the time series method can be implemented in a real time control system at the mines. Through experimentation at an actual mine, the algorithm was tested using lead 5 forecast to see if the reduction in updates had any significant effect on its performance. When the model parameters were updated at every instance, the algorithm met target in 41 out of 52 cases, yielding 49838 tons in the no wash pile. With SPC, the algorithm worked in 40 cases and yielded 48730 tons. SPC also executed in a very short time compared to the other procedure.

In the second instance, the change in model parameters was also tracked (see FIG. 12). It is seen that the AR parameters $\theta_0$ (the constant) and $\phi_1$, undergo gradual changes in spite of fewer updates (note that the two parameters are plotted on different scales). Therefore, from FIG. 12 and the performance, it was concluded that the reduced number of updates did not significantly affect the performance.

The developed time series algorithm was next implemented using lead 1, lead 2, lead 3 and lead 5 forecasts. Several lead times were used due to the lack of theoretical guidance on which forecast lead is most appropriate. Table 3 lists the performance of this method for various lead times:

TABLE 3

Performance of the time series method for various forecast leads.

| Forecast Type | No. of Successful Cases | Tons Yielded | Ave. Error | Ave. % max. yld. |
|---|---|---|---|---|
| Lead 1 | 44 | 49186 | 0.311 | 0.849 |
| Lead 2 | 44 | 50711 | 0.498 | 0.885 |
| Lead 3 | 41 | 49426 | 0.476 | 0.901 |
| Lead 5 | 40 | 48730 | 0.589 | 0.924 |
| Lead 10 | 37 | 43670 | 0.615 | 0.899 |

It is apparent from the table that the longer the forecast lead, fewer is the number of successful cases. This is expected, since short term forecasts are more accurate. However, the average percentage maximum yield is higher for longer leads. For each case, its yield was noted in terms of the percentage of the maximum possible yield. The maximum possible yield is based on optimal segregation of the ultimate distribution (which cannot be known a priori). The comparison of the actual yield to the maximum possible yield indicates the efficacy of the algorithm. For lead 1, for example, each successful case achieved on average 84.9% of the maximum possible yield. Thus, longer lead time forecasts resulted in greater yield as evidenced by the higher average percentage maximum yield, while shorter lead times resulted in better target control, which is indicated from the larger number of successful cases. Better target control is also indicated by the average error. Here, the error is defined as the deviation of the achieved no wash mean from the customer specification. This was computed only for cases that failed to meet specifications. It is seen from the table that the no wash pile for the failed cases for lead 1 had, on average, 0.311% ash greater than the target. Not apparent from Table 3 above is that the time series algorithm failed more in short data sets (211 tons and 328 tons). Failure in short data sets need not construe failure in general, as in such data sets the algorithm does not enough data to optimize performance. By way of comparison with Table 2, the time series approach performed very favorably compared to the industrial segregation algorithm.

One potential limitation of the time series method described above is that all observations since the previous update are used in the computation of the new set of values. Note that an update is conducted when a process change is detected, and often the detection of a process change does not mean the start of the change. Instead, the process change started before detection. Therefore, some of the observations before detection are part of the present process. These observations, termed spurious observations, preferably are left out of the updating procedure. To prevent use of these observations, an arbitrary method described below, called Modified Time Series method (MTS), is used.

To explain the difference between the modified time series and the regular time series method, a theoretical example is given. If the first detection of process change occurs at observation t, only observations following the $t^{th}$ observation should be used. However, some observations are needed for computations. Thus, in this example, it is assumed that at least 40 observations are needed for an update and, therefore, there should be no update for the next 39 observations. When an update is conducted at t+39 and the previous 40 observations are used, the update is pure, since it contains no spurious observations. However, since 40 observations is a relatively long time between updates, updates are also conducted at t+9, t+19, t+29 before the pure update at t+39. The first three updates would only consider the past 40 observations. For example, the update at t+9 would use observations t−30 through t+9. After the pure update at t+39, the test for process change is resumed. This is repeated until the end of segregation. To start the process, the test for process change is not implemented until 40 observations have been realized. In summary, the modified time series method makes pure updates with three intermediate updates between pure updates.

Through experimentation, it was determined that the above changes in the time series method improved the performance. Also, the modified time series method was robust in two section data. Table 4 shows the performance of the MTS method:

TABLE 2

Performance with the MTS method.

| Forecast Type | No. of Successful Cases | Tons Yielded | Ave. Error | Ave. % max. yld. |
|---|---|---|---|---|
| Lead 1 | 46 | 50904 | 0.311 | 0.860 |
| Lead 5 | 40 | 49978 | 0.384 | 0.931 |
| Lead 10 | 37 | 49553 | 0.535 | 0.899 |

For each lead, the yield and average percentage maximum yield are equal or greater than the previous method. The average errors are also below the previous method. Thus, the MTS method is an improvement over the original time series method.

As should be appreciated by one of ordinary skill in the art, the methods described above may be implemented using a computer program running on a conventional personal computer or the like.

In summary, the problem of segregating minerals with an aim to not just meet the customer specifications, but also to maximize yield, has been overcome using methods that include time series analysis, optimal estimation of model parameters, and statistical process control. Overall, the methods are robust in coal mines producing two independent sections of minerals and have a generally high success rate. Indeed, the yield and the number of successful cases are significantly higher than the industrial algorithm.

The foregoing description of various preferred embodiments of the present invention has been presented for purposes of illustration and description. This description is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method of segregating a mineral stream into a first fraction substantially meeting a particular customer specification and a second fraction requiring further processing such that the proportion of the mineral stream in the first fraction is maximized, comprising:

(a) observing a value of a selected parameter for a plurality of segments of the mineral stream to establish an original minimum history of data values;

(b) creating an existing model to fit the minimum history;

(c) obtaining a new value of the parameter for a particular segment of the mineral stream;

(d) determining whether the new value is likely in view of the model;

(e) calculating a cutoff value based on a current target value;

(f) making a segregation decision based on whether the new value is above or below the cutoff value; and (g) repeating steps (c)–(f).

2. The method according to claim 1, wherein if the new value is likely given the existing model, said method further includes:

(d)(1) establishing an empirical distribution including the new value and the original minimum history of data values; and wherein the step of calculating a cutoff value includes determining the cutoff value as a point of truncation of a histogram of the empirical distribution such that the mean of the truncated distribution is equal to the current target value.

3. The method according to claim 1, wherein if the new value is likely given the existing model, said method further includes:

(d)(1) assuming a normal distribution based on the new value and computing a mean and variance of the original minimum history of data values; and wherein said step of calculating a cutoff value includes determining the cutoff value as a point of truncation of said normal distribution such that the truncated normal distribution is equal to the current target value.

4. The method according to claim 1, wherein if the new value is not likely given the existing model, said method further includes:

(d)(1) discarding the original minimum history of values and recording the new value as a first value in a new minimum history;

(d)(2) calculating a new cutoff value based on a new current target value using at least the original minimum history;

(d)(3) determining if the new value is above or below the new cutoff value and making a segregation decision based on the determination;

(d)(4) obtaining a subsequent new value and repeating steps (d)(2)–(d)(3) until the new minimum history has a predetermined number of new values;

(d)(5) substituting the new minimum history for the original minimum history in step (b) and creating an updated model to replace the existing model using the new minimum history prior to repeating steps (c)–(f).

5. The method according to claim 4, wherein at least the original minimum history is an entire history of data values since step (a) first occurred.

6. The method according to claim 4, wherein the predetermined number of values required to form the new minimum history is at least five.

7. The method according to claim 4, wherein the predetermined number of values required to form the new minimum history is five or fifteen.

8. The method according to claim 1, wherein the model is a time series model.

9. The method according to claim 8, wherein the time series model is an autoregressive order one model.

10. The method according to claim 1, wherein the current target is an average level of the selected parameter that all future segments of mineral segregated to the first fraction must meet so that the entire first fraction meets the customer specification.

11. The method according to claim 1, wherein the minimum history of values is selected from the group consisting of 10, 25, 50, 150, and 200.

12. The method according to claim 1, wherein the step of determining whether the value is likely includes:

(d)(1) predicting the new value using the existing model;

(d)(2) calculating a residual value between the predicted new value and the actual new value;

(d)(3) using the residual value to determine whether the new value should be retained as part of the original minimum history or a new minimum history including the new value should be established and substituted for the original minimum history in step (b) prior to repeating steps (c)–(f).

13. The method according to claim 1, further including physically segregating the mineral stream based on the segregation decision.

14. The method according to claim 1, wherein the existing model is a time series model, and if the new value is likely given the existing model, said method further includes:

(d)(1) forecasting a mean and variance at an appropriate lead using the time series model; and wherein the cutoff value is calculated as a point of truncation of a normal distribution having the forecasted mean and variance such that the mean of the truncated distribution is equal to the current target value.

15. The method according to claim 1, wherein the existing model is a time series model, the minimum history of values includes a substantial number of original values, and if the new value is not likely given the existing model, said method further includes:

(d)(1) updating the existing time series model using at least the substantial number of values;

(d)(2) forecasting a mean and variance at an appropriate lead using the updated model; and wherein the cutoff value is calculated as a point of truncation of a normal distribution having the forecasted mean and variance such that the mean of the truncated distribution is equal to the current target value.

16. The method according to claim 1, wherein the model is a time series model, the minimum history of values includes a substantial number of original values, and if the new value is not likely given the existing model, said method further includes the following steps prior to the calculating step:

(d)(1) updating the existing model using a predetermined minimum number of the original values;

(d)(2) using the updated model for a certain number of new values obtained, while discarding a same number of the original values in the substantial number of values;

(d)(3) forecasting a mean and a variance at an appropriate lead using the updated model;

(d)(4) calculating a new cutoff value based on a new current target value, wherein the cutoff value is calculated as a point of truncation of a normal distribution having the forecasted mean and variance such that the mean of the truncated distribution is equal to the new current target value;

(d)(5) determining if a current new value under consideration is above or below the new cutoff value;

(d)(6) making a segregation decision based on the determination;

(d)(7) repeating steps (d)(1)–(d)(6) until a substantial number of new values are taken; and (d)(8) substituting the substantial number of new values for the substantial number of original values forming the minimum number of values in step (b) and substituting the updated model for the existing model prior to repeating steps (c)–(f).

17. A method of segregating a mineral stream into a first fraction meeting a particular customer specification and a second fraction requiring further processing such that the proportion of the mineral stream in the first fraction is maximized, comprising:

(a) observing a selected parameter of a plurality of segments of the mineral stream to establish a substantial number of original data values;

(b) creating an existing model to fit the substantial number of original values;

(c) obtaining a new value of the parameter for a particular segment of the mineral stream;

(d) determining whether the new value is likely given the existing model;

(e) calculating a cutoff value based on a current target value;

(f) determining if the new value is above or below the cutoff value and making a segregation decision based on the determination; and (g) repeating steps (c)–(f).

18. The method according to claim 17, wherein if the new value is likely given the existing model, said method further includes:

(d)(1) forecasting a mean and variance at an appropriate lead using the existing model; and wherein the cutoff value is calculated as a point of truncation of a normal distribution having the forecasted mean and variance such that the mean of the truncated distribution is equal to the current target value.

19. The method according to claim 17, wherein if the new value is not likely given the existing model, said method further includes:

(d)(1) updating the existing model using at least the substantial number of original values;

(d)(2) forecasting a mean and variance at an appropriate lead using the updated model; and wherein the cutoff value is calculated as a point of truncation of a normal distribution having the forecasted mean and variance such that the mean of the truncated distribution is equal to the current target value.

20. The method according to claim 17, wherein if the new value is not likely given the existing model, said method further includes the following steps prior to the calculating step:

(d)(1) updating the existing model using a predetermined minimum number of the original values;

(d)(2) using the updated model for a certain number of new values obtained, while discarding a same number of the original values in the substantial number of values;

(d)(3) forecasting a mean and variance at an appropriate lead using the updated model;

(d)(4) calculating a new cutoff value based on a new current target value, wherein the new cutoff value is calculated such that the mean of a truncated normal distribution having the forecasted mean and variance is equal to the new current target value;

(d)(5) determining if a current new value is above or below the new cutoff value;

(d)(6) making a segregation decision based on the determination;

(d)(7) repeating steps (d)(1)–(d)(6) until a substantial number of new values are taken; and (d)(8) substituting the substantial number of new values for the substantial number of original values forming the minimum number of values in step (b) and substituting the updated model for the existing model prior to repeating steps (c)–(f).

21. The method according to claim 17, wherein the substantial number of original values is at least 200.

* * * * *

UNITED STATES PATENT AND TRADEMARK OFFICE

CERTIFICATE OF CORRECTION

PATENT NO. : 6,675,064 B1

DATED : January 6, 2004
INVENTOR(S) : Jon C. Yingling and Rajive Ganguli

It is certified that error appears in the above-identified patent and that said Letters Patent is hereby corrected as shown below:

Title page,
Item [60], Related U.S. Application Data, the Provisional Application date of "September 17, 1999" should be -- September 27, 1999 --.

Column 1,
Line 2, the Provisional Application date of "September 17, 1999" should be -- September 27, 1999 --.

Signed and Sealed this

Seventh Day of September, 2004

JON W. DUDAS
*Director of the United States Patent and Trademark Office*